Patented Sept. 8, 1936

2,053,457

UNITED STATES PATENT OFFICE 2,053,457

PROCESSES OF REMOVING OIL FROM BETA BETA' DICHLORETHYL ETHER

Harry T. Bennett and Joel L. Burkitt, Tulsa, Okla., assignors to Mid-Continent Petroleum Corporation, Tulsa, Okla., a corporation of Delaware No Drawing. Application February 4, 1935, Serial No. 4,875

10 Claims. (Cl. 260—151)

This invention relates to processes of removing oil and similar substances from beta beta' dichlorethyl ether, and especially from beta beta' dichlorethyl ether used in the extraction of oils.

In the processing of oils with beta beta' dichlorethyl ether as a selective solvent, the used beta beta' dichlorethyl ether is ordinarily recovered by distillation and reused for an indefinite period. However, in actual practice, the beta beta' dichlorethyl ether may become contaminated with oil of such a nature that it can not be readily or economically separated from the solvent by distillation. This oil either impairs the selective action of the beta beta' dichlorethyl ether, or necessitates the use of greater amounts of the contaminated solvent, or both.

An object of the present invention is to provide a practicable and entirely feasible and economical method of removing the contaminating oil from beta beta' dichlorethyl ether, or the like.

The contaminating material may be one, or more, of various constituents of the oil dissolved by the selective action of the beta beta' dichlorethyl ether, and even in the extraction of petroleum lubricating oil the beta beta' dichlorethyl ether may be contaminated by naphtha, or some other minor constituent of the oil, having boiling points approximating the boiling points of beta beta' dichlorethyl ether.

More specifically stated, the process may consist in mixing contaminated beta beta' dichlorethyl ether with sulphuric acid of 60% by weight strength up to 100% by weight strength. It is preferable to use an acid of 85% or more by weight strength because the stronger acid has a polymerizing action on constituents of certain oils and may facilitate the purification of the beta beta' dichlorethyl ether in subsequent distillation. The polymerizing action of the sulphuric acid on constituents of certain oils is such as to make those constituents and their polymerization products less volatile.

The acid is used in such strength and amount as will dissolve most of the beta beta' dichlorethyl ether and, in some cases, part of the oil, and leave undissolved a substantial amount of the oil which separates as a distinct layer and may be removed.

A small portion of the beta beta' dichlorethyl ether may remain dissolved in the oil layer and may be further extracted, if desired, by again mixing with acid as many times as may be desirable. This may be done either with fresh acid, with partly used acid from some other part of the process or according to the counter-current principle. Owing to the difference in specific gravities, the oil layer can be rapidly separated by settling, but the separation may be expedited, if desired, by centrifuging.

The temperature of the oil-contaminated beta beta' dichlorethyl ether and sulphuric acid mixture is preferably maintained below 200° F. to avoid or minimize destruction of the beta beta' dichlorethyl ether by the sulphuric acid.

After separating the oil layer, the solution of beta beta' dichlorethyl ether in sulphuric acid is added to water, or more dilute acid, to dilute the acid to below 80% strength by weight in order to separate the beta beta' dichlorethyl ether from the acid. The strength of the acid is calculated on the basis of the acid and water present disregarding the beta beta' dichlorethyl ether present. The acid is preferably diluted to such strength as will throw out of solution substantially all of the beta beta' dichlorethyl ether. Too great dilution is preferably avoided in order to minimize acid recovery costs. The sulphuric acid dilution may be accomplished all at once or preferably in two or more stages. In some cases, it may be necessary or advisable to cool the mixture while diluting the acid.

In some cases it is desirable, after removing the first oil layer, to separate oil still remaining in solution in the beta beta' dichlorethyl ether-sulphuric acid mixture by diluting the acid with water or dilute acid in such amount as will cause a further separation of a layer consisting of oil and beta beta' dichlorethyl ether. This dilution and subsequent separation of the oily layer formed may be continued as many times as desired until substantially all of the oil has been separated from the beta beta' dichlorethyl ether sulfuric acid mixture. After the oil has been substantially removed from the beta beta' dichlorethyl ether sulfuric acid mixture, the latter is diluted with water or dilute acid from some other part of the process to the desired strength to recover the beta beta' dichlorethyl ether.

The oily layers which have been separated as described above, and which may contain appreciable amounts of beta beta' dichlorethyl ether may be further extracted with strong sulfuric acid, either separately or after combining some or all together to remove the beta beta' dichlorethyl ether that may be present. This may be accomplished if desired, by fresh acid, or partly used acid from some other part of the process or according to the counter-current principle. To recover the beta beta' dichlorethyl ether from this acid it may be combined with the acid from the main extraction and thereafter diluted with the main body, or it may be diluted separately, as described for the acid of the main extraction. Oil recovered by the stepwise dilution of this acid may be again extracted with further acid.

Upon dilution of the beta beta' dichlorethyl ether and sulphuric acid solution with sufficient water or dilute acid substantially all of the beta beta' dichlorethyl ether can be readily separated from the sulphuric acid, either by settling or centrifuging. The small amount of acid in the recovered beta beta' dichlorethyl ether may be removed by washing with water, or an alkaline solution, or in any other suitable manner.

The recovered beta beta' dichlorethyl ether may be further purified by distillation.

The sulphuric acid may be recovered by any suitable recovery or concentration process.

The nature of the contaminating oil in the selective solvent will vary in the treatment of different oils, and in the use of different solvents. In some cases, an unexpected constituent of the oil will contaminate the selective solvent used in processing the oil, and the nature of the objectionable constituent may be unknown, or uncertain.

However, if the selective solvent is effectively separated from the contaminating material, the nature of that material is not very important. In the previous illustration, we have shown how beta beta' dichlorethyl ether can be separated from its contaminating material, and while such material may occur in using beta beta' dichlorethyl ether as a selective solvent to refine lubricating oils by dividing them into naphthenic and paraffinic fractions, having high and low viscosity index constituents, it is to be understood that the nature of the contaminating material will vary, the object being to eliminate such material from the used solvent.

As a very specific illustration, we will refer to a laboratory demonstration of the invention, wherein low boiling point petroleum fractions appear as the contaminating oil in beta beta' dichlorethyl ether; and sulphuric acid is used for removing the oil from the beta beta' dichlorethyl ether, as shown by the following table.

|  | Spec. grav. at 60° F. | A. S. T. M. distillation, degrees Farenheit | | | | |
| --- | --- | --- | --- | --- | --- | --- |
|  |  | Initial boiling point | 10% | 50% | 90% | Max. |
| Sulphuric acid | 1.8331 | | | | | |
| Contaminating oil | 0.7845 | 310 | 320 | 344 | 370 | 409 |
| Beta beta' dichlorethyl ether (original) | 1.2240 | 332 | 347 | 349 | 349 | 356 |
| Beta beta' dichlorethyl ether separated from the contaminating oil | 1.2219 | 320 | 346 | 348 | 349 | 352 |

The A. S. T. M. distillation mentioned in the above table refers to the American Society for Testing Materials' method D—86—30 published in American Society for Testing Materials Standard on Petroleum Products and Lubricants, of September, 1934, pages 84 to 99.

The foregoing table shows that, owing to its boiling points, the contaminating oil could not be effectively separated from the beta beta' dichlorethyl ether by distillation.

A solution of five parts by volume of contaminating oil of the characteristics indicated in the foregoing table and ninety-five parts of beta beta' dichlorethyl ether of the characteristics indicated in the table as "original" was made. Seven hundred fifty cc. of this solution (37.5 cc. oil and 712.5 cc. beta beta' dichlorethyl ether) were mixed with 250 cc. of sulphuric acid of the specific gravity indicated in the table. The mixture was allowed to settle and the oil layer removed. After another extraction of the separated oil layer with 26.5 cc. of the same strength acid, the oil measured 23.4 cc. and had a specific gravity at 60° F. of 0.7765.

A large percentage of the contaminating oil was thus separated from the solution of sulphuric acid and beta beta' dichlorethyl ether. This was followed by successive dilutions of the acid solution.

More specifically stated, this solution of acid and beta beta' dichlorethyl ether (including a small percentage of the contaminating oil) was first diluted with 53 cc. water. This preliminary dilution resulted in a separation of beta beta' dichlorethyl ether and oil amounting to 105 cc., which was treated with acid having a gravity of 1.8331, the amount of acid being one fourth the volume of beta beta' dichlorethyl ether, and this acid treatment resulted in a yield of 5.3 cc. of free oil having a specific gravity of 0.8845 at 60° F.

The main solution of sulphuric acid and beta beta' dichlorethyl ether was further diluted with approximately 3.5 cc. water, and this resulted in a separation of approximately 22 cc. of the beta beta' dichlorethyl ether-oil solution, which yielded 1.3 cc. of oil when treated with a further amount of 1.8331 specific gravity sulphuric acid, the amount of acid being one fourth the volume of the beta beta' dichlorethyl ether.

The remaining beta beta' dichlorethyl ether sulphuric acid solution on dilution with water to approximately fifty per cent acid strength (calculated on the sulphuric acid and water present) and subsequent distillation of the beta beta' dichlorethyl ether with steam yielded 705 cc. of recovered beta beta' dichlorethyl ether having the characteristics shown in the lower portion of the foregoing table. Approximately 3 cc. of oil remained in the still after the beta beta' dichlorethyl ether had been distilled off.

The stepwise dilutions resulting in successive reductions in the strength of the acid increase the efficiency of the process. This is due to the high concentration of the contaminating oil in the relatively small bodies of oil and beta beta' dichlorethyl ether obtained by the step by step dilutions. These successive dilutions enable the contaminating oil to be most effectively separated from the beta beta' dichlorethyl ether.

The foregoing laboratory demonstration was made to provide a specific illustration of materials that were deliberately proportioned for the test, wherein a contaminating material was removed by dissolving beta beta' dichlorethyl ether in sulphuric acid to produce a solution having a specific gravity substantially different from that of the contaminating material, which is substantially insoluble in said solution, and thereafter separating said contaminating material from the solution.

The invention is especially adapted for use in the separation of contaminating materials from beta beta' dichlorethyl ether used in the extraction of lubricating oils, and in actual practice, the solution of extracted oil may be first distilled to separate the beta beta' dichlorethyl ether from the extracted oil. When the distilled beta beta' dichlorethyl ether becomes contam-

We claim:

1. The process of removing mineral oil from beta beta' dichlorethyl ether which comprises dissolving the dichlorethyl ether in sulphuric acid, separating oil from the resultant solution, and separating the dichlorethyl ether from the acid.

2. In the recovery of beta beta' dichlorethyl ether used as a selective solvent in the extraction of mineral oil, the process of removing contaminating material from the used dichlorethyl ether which comprises mixing said used dichlorethyl ether with sulphuric acid, separating said contaminating material from the acid solution, and diluting said acid solution to release the dichlorethyl ether from the acid.

3. In the recovery of beta beta' dichlorethyl ether used as a selective solvent, the process of removing contaminating mineral oil from the used dichlorethyl ether, which comprises dissolving the used dichlorethyl ether in sulphuric acid to produce a solution having a specific gravity substantially different from that of said oil, separating said oil from said solution, and thereafter separating said used dichlorethyl ether from said solution.

4. In the recovery of beta beta' dichlorethyl ether used as a selective solvent in the extraction of mineral oil, the process of removing contaminating material from the used dichlorethyl ether which comprises mixing said used dichlorethyl ether with sulphuric acid having a strength great enough to dissolve a substantial portion of said used dichlorethyl ether in the acid, separating said contaminating material from the resultant acid solution, and thereafter diluting said acid solution to release the dichlorethyl ether from the acid.

5. In the recovery of beta beta' dichlorethyl ether used in the extraction of oil, the process of removing contaminating mineral oil from the used dichlorethyl ether which comprises mixing said used dichlorethyl ether with sulphuric acid having a strength great enough to dissolve a substantial portion of said used dichlorethyl ether in the acid, separating contaminating oil from the resultant acid solution, and thereafter diluting said acid solution to a strength less than 80% by weight, based upon the acid and diluent and not including the dichlorethyl ether, so as to separate the dichlorethyl ether from the acid.

6. In the recovery of beta beta' dichlorethyl ether used in the extraction of mineral oil, the process which comprises distilling a solution of the extracted oil to separate the dichlorethyl ether from said extracted oil, thereafter removing contaminating oil from the distilled dichlorethyl ether by dissolving said dichlorethyl ether in sulphuric acid which is readily miscible with said dichlorethyl ether but not with said contaminating oil, thereby producing a solution having a specific gravity substantially different from that of the contaminating oil, separating said contaminating oil from the last mentioned solution, and separating dichlorethyl ether from said last mentioned solution.

7. In the recovery of beta beta' dichlorethyl ether used in the extraction of mineral oil, the process of removing contaminating oil from the used dichlorethyl ether, which comprises dissolving said dichlorethyl ether in sulphuric acid having a strength great enough to dissolve a substantial portion of said dichlorethyl ether, thereby producing an acid solution having a specific gravity substantially different from that of the contaminating oil, separating said contaminating oil from said acid solution, and thereafter subjecting said acid solution to step by step dilutions, so as to successively remove portions of the dichlorethyl ether from the sulphuric acid.

8. In the recovery of beta beta' dichlorethyl ether used in the extraction of mineral oil, the process of removing contaminating oil from the used dichlorethyl ether, which comprises dissolving said dichlorethyl ether in sulphuric acid having a strength great enough to dissolve a substantial portion of said dichlorethyl ether, thereby producing an acid solution having a specific gravity substantially different from that of the contaminating oil, separating said contaminating oil from said acid solution, and thereafter subjecting said acid solution to step by step dilutions, so as to successively remove portions of the dichlorethyl ether from the sulphuric acid, and separating additional contaminating oil from said removed portions of the dichlorethyl ether.

9. In the recovery of beta beta' dichlorethyl ether used as a selective solvent in the extraction of mineral oil, the process of removing contaminating oil from said used dichlorethyl ether which comprises mixing the used dichlorethyl ether with sulphuric acid having a strength great enough to dissolve a substantial portion of the dichlorethyl ether in the sulphuric acid, separating contaminating oil from the resultant solution of dichlorethyl ether and sulphuric acid, mixing said separated oil with sulphuric acid strong enough to dissolve additional dichlorethyl ether in the sulphuric acid, separating the solutions of dichlorethyl ether and sulphuric acid from contaminating oil, and diluting the separated acid solutions to separate the dichlorethyl ether from the acid.

10. In the recovery of beta beta' dichlorethyl ether used as a selective solvent in the extraction of mineral oil, the process of removing contaminating oil from said used dichlorethyl ether which comprises mixing the used dichlorethyl ether with sulphuric acid having a strength of about 60% to 100% by weight, separating contaminating oil from the resultant solution of dichlorethyl ether and sulphuric acid, mixing said separated oil with sulphuric acid to dissolve additional dichlorethyl ether in the sulphuric acid, separating the solutions of dichlorethyl ether and sulphuric acid from oil, diluting the separated acid solutions with water to about 50% strength by weight, based upon the acid and water, to separate the dichlorethyl ether from the acid, and distilling the separated dichlorethyl ether from oil remaining therein.

HARRY T. BENNETT.
JOEL L. BURKITT.